US012748845B2

(12) United States Patent
Bartling et al.

(10) Patent No.: US 12,748,845 B2
(45) Date of Patent: Sep. 29, 2026

(54) BEHAVIORAL SYSTEM-LEVEL DETECTOR THAT FILTERS LOCAL ALERTS TO GENERATE SYSTEM ALERTS WITH AN INCREASED CONFIDENCE LEVEL

(71) Applicant: Arm Limited, Cambridge (GB)

(72) Inventors: Michael Bartling, Austin, TX (US); Brendan James Moran, Coton (GB)

(73) Assignee: ARM LIMITED, Cambridge (GB)

( * ) Notice: Subject to any disclaimer, the term of this patent is extended or adjusted under 35 U.S.C. 154(b) by 227 days.

(21) Appl. No.: 18/178,974

(22) Filed: Mar. 6, 2023

(65) Prior Publication Data

US 2024/0303335 A1 Sep. 12, 2024

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01); *G06F 2221/034* (2013.01)

(58) Field of Classification Search
CPC . G06F 21/566; G06F 21/554; G06F 2221/034
See application file for complete search history.

(56) References Cited

U.S. PATENT DOCUMENTS 6,704,874 B1 * 3/2004 Porras ................. H04L 63/1458 709/224
10,178,109 B1 * 1/2019 Miskovic ............ H04L 63/1416
10,437,998 B2 * 10/2019 Shanmugavelayutham ................ G06F 21/566
10,826,756 B2 * 11/2020 Kliger ................. H04L 41/0631
10,984,096 B2 * 4/2021 Yamada ................ G06F 21/554
11,256,673 B2 * 2/2022 Bedadala ............ G06F 16/2365
2021/0073097 A1 * 3/2021 Upadhyay ........... G06F 11/0757
2023/0325192 A1 * 10/2023 Yasin .................... G06F 11/348 712/239
2023/0368069 A1 * 11/2023 Xu ......................... G06N 3/045

FOREIGN PATENT DOCUMENTS

CN 110336821 A * 10/2019 ......... H04L 63/1416
CN 118095028 A * 5/2024 ............. G06F 30/27

* cited by examiner

*Primary Examiner* — Christopher A Revak
(74) *Attorney, Agent, or Firm* — Talem IP Law, LLP

(57) ABSTRACT

A behavioral system level detector and method that filters local alerts to generate system alerts with an increased confidence level is provided. The method includes receiving local alerts from a local detector that detects events from a processing unit, wherein each local alert comprises information of an event from the processing unit and a timing relationship for the event, filtering the local alerts to determine events indicating an undesirable behavior or attack, and responsive to the determination that there are events indicating the undesirable behavior or the attack, generating a system alert. The behavioral system-level detector includes a shared data structure for storing local alerts received from at least one local detector and system processing unit coupled to the shared data structure to receive the local alerts and coupled to receive state information from the processing units.

18 Claims, 5 Drawing Sheets

BEHAVIORAL SYSTEM-LEVEL DETECTOR THAT FILTERS LOCAL ALERTS TO GENERATE SYSTEM ALERTS WITH AN INCREASED CONFIDENCE LEVEL

BACKGROUND

In conventional computers and computer networks, an attack refers to various attempts to achieve unauthorized access to technological resources. An attacker may attempt to access data, functions, or other restricted areas of a susceptible computing system without authorization. For example, the attacker may attempt to corrupt parts of the susceptible computing system, which may appear benign in nature, or to overwhelm public operations by forcing these operations to be called excessively. Thus, an attacker can use many types of attacks with different goals in mind to attack a technological resource.

Central Processing Units (CPUs) with performance monitoring capability such as a performance monitoring unit (PMU) have the capacity to produce detailed information about the operations performed by the CPU. This detailed information is typically tracked in terms of 'events', which are the result of processor execution. From these PMU events one can infer higher level software behaviors enabling a defender or trusted party of the computing system to detect an attack to the computing system and, potentially, to detect the attack as its happening.

BRIEF SUMMARY

A behavioral system-level detector that filters local alerts to generate system alerts with an increased confidence level over a confidence level of the local alerts is provided. Behavior of a circuit such as a processor or other device, including the success of commands or particular operations can be represented as a series of events in an event stream. These events, describing software behaviors, can be classified and compared to known behaviors for reasoning on whether the behavior is an undesirable behavior or whether it falls within a range of acceptable behavior.

A method includes receiving local alerts from a local detector that detects events from a processing unit, wherein each local alert comprises information of an event from the processing unit and a timing relationship for the event, ordering the local alerts according to the timing relationship for the event, filtering the local alerts to determine events indicating an undesirable behavior or attack, and responsive to the determination that there are events indicating the undesirable behavior or the attack, generating a system alert.

A system-level detector includes a shared data structure for storing local alerts received from at least one local detector that detects events from a corresponding processing unit, wherein each local alert comprises information of an event from the processing unit and a timing relationship for the event and a system processing unit coupled to the shared data structure to receive the local alerts from the shared data structure and coupled to receive state information of each corresponding processing unit. The system processing unit has instructions to receive a local alerts from the shared data structure, order the local alerts according to the timing relationship for the event, filter the ordered local alerts to determine events indicating an undesirable behavior or attack, and responsive to the determination that there are events indicating the undesirable behavior or the attack, generate a system alert.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A behavioral system-level detector that filters local alerts to generate system alerts with an increased confidence level over a confidence level of the local alerts is provided. For a processing unit, there can be local detectors (e.g., part of the circuitry of the processing unit or separate circuitry) used to monitor for events that may indicate an attack or even an inefficiency at the processing unit. For example, in the scenario of a processing unit of a CPU core with a PMU, local detectors, can be configured to receive PMU events (directly in an aggregate form or in some form of consumable event) and generate local alerts when undesirable behaviors are encountered. A consumable event refers to an event corresponding to or associated with behaviors of a processing unit or other circuit and is consumable because it is information that is in a format that can be consumed/used by another device, circuit, or system. The particular format of a consumable event can vary. Alternately, a local detector can receive the events directly from the processing unit, e.g., bypassing the PMU, process the events into a consumable event, and generate local alerts when undesirable behaviors are encountered. However, these types of low-level local detectors are inherently noisy, such that many of the local alerts identifying an undesirable behavior are false positives, e.g., the behavior associated with the event is a benign behavior that is mis-predicted as malicious by the local detector. These false positives negatively impact the total performance of the system.

Figure 1:
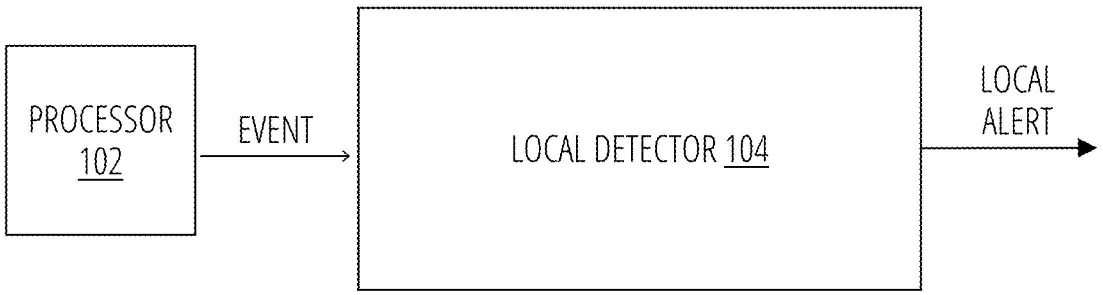
FIG. 1 illustrates a schematic diagram of an operating environment for a behavioral sensor creating consumable events.

FIG. 1 illustrates a schematic diagram of an operating environment for a local detector 104 creating local alerts. A local detector 104 can receive an event stream of events related to actions of a processing unit such as a processor 102. Although specific reference is made to a processor 102, processing unit can be, but is not limited to, a CPU, graphics processing unit (GPU), microcontroller, or computing unit (e.g., multiplier-accumulator (MAC) unit with memory). Similarly, it should be understood that the local detector (e.g., local detector 104) can receive events from (and be used to create consumable events from) other sources such as, but not limited to, memory controllers, cache controllers, bus interface units (e.g., PCLs), network interface controllers, mixed signal blocks (e.g., used for radio interface), and digital filters.

The event stream of events can, for example, be a bit stream produced by a PMU that monitors and records actions of the processor 102. These PMU events can describe issues that occur during execution of commands from the processor 102. The PMU event can include, but are not limited to, branch mis-predict, load retired, store retired, branch retired, and cache miss. Events may be 1-bit information or multi-bit signals (e.g., 2-bits, 3-bits). Events can be PMU events, come from a variety of sources, or may be derived from combinations of existing sources. For illustrative purposes only, the remainder of the application will refer to an event as a PMU event, however, events can be other types of events as stated above. The local detector 104 can process events of the event stream to create classified events, for example, the classified event can be stored in storage or immediately used by another system or device, such as by system-level detector 202. The local detector 104 is able to produce consumable events from the classified events that maintain temporal information and the order of events, which benefits a variety of applications.

The local detector 104 takes in a window of PMU events or samples, transforms the features into a consumable form, e.g., a consumable event, and then identifies which predefined categories the window may belong to, or be composed of. The consumable form may include a score indicating a confidence level of the prediction to the predefined categories the window may belong to or be composed of.

In some cases, the local detector takes in the PMU event and creates a classified event. Initially the local detector 104 extracts a feature, or features, from the PMU event and then classifies the features into a classified event associated with a time using predefined categories based on the received features of the particular event. The classification to predefined categories can include a confidence score such that the classification is not simply a binary determination (e.g., belonging to the category or not belonging to the category) but quantizes a classification measure (e.g., a value between 0 and 255, inclusive, where 0=definitely not belonging to the category and 255=definitely belong to the category. In some cases, local detectors use machine learning (ML) to classify data, such as events, or to extract features from a PMU event. In the cases where ML is used to classify data, the determination of the confidence score is relative to a training data set of the predefined categories. While a quantified classification measure has been used as an example, the confidence score can also include a prediction probability, log likelihood estimate, distance to category, etc. The classified event and subsequent classified events extracted from the event stream by the local detector 104 within a time frame are appended in a time series forming a consumable event.

The local detector 104 can use the consumable events (e.g., classified event with timing relationship for the event) to determine if an undesirable behavior has occurred. If an undesirable behavior has occurred, a local alert can be sent by the local detector 104 out for use by other applications, such as by system-level detector 202. The local alert includes the consumable event, e.g., information of the event and the timing information of the event.

However, as stated above, the local detectors 104 can be inherently noisy, creating alerts for patterns detected that may not be associated with an attack or undesirable behavior. For example, while the local detectors utilizing machine learning mostly create accurate results when classifying data or extracting features, these local detectors are prone to errors. Thus, local detectors can sometimes produce faulty data, such as generating a false positive. In addition, the local detectors 104 are small, e.g., having limited computing power available, and run at high speeds such that the local detectors 'consume', or analyze, the consumable events very quickly, e.g., on the order of microseconds, which can affect the accuracy of local alerts.

Figure 2:
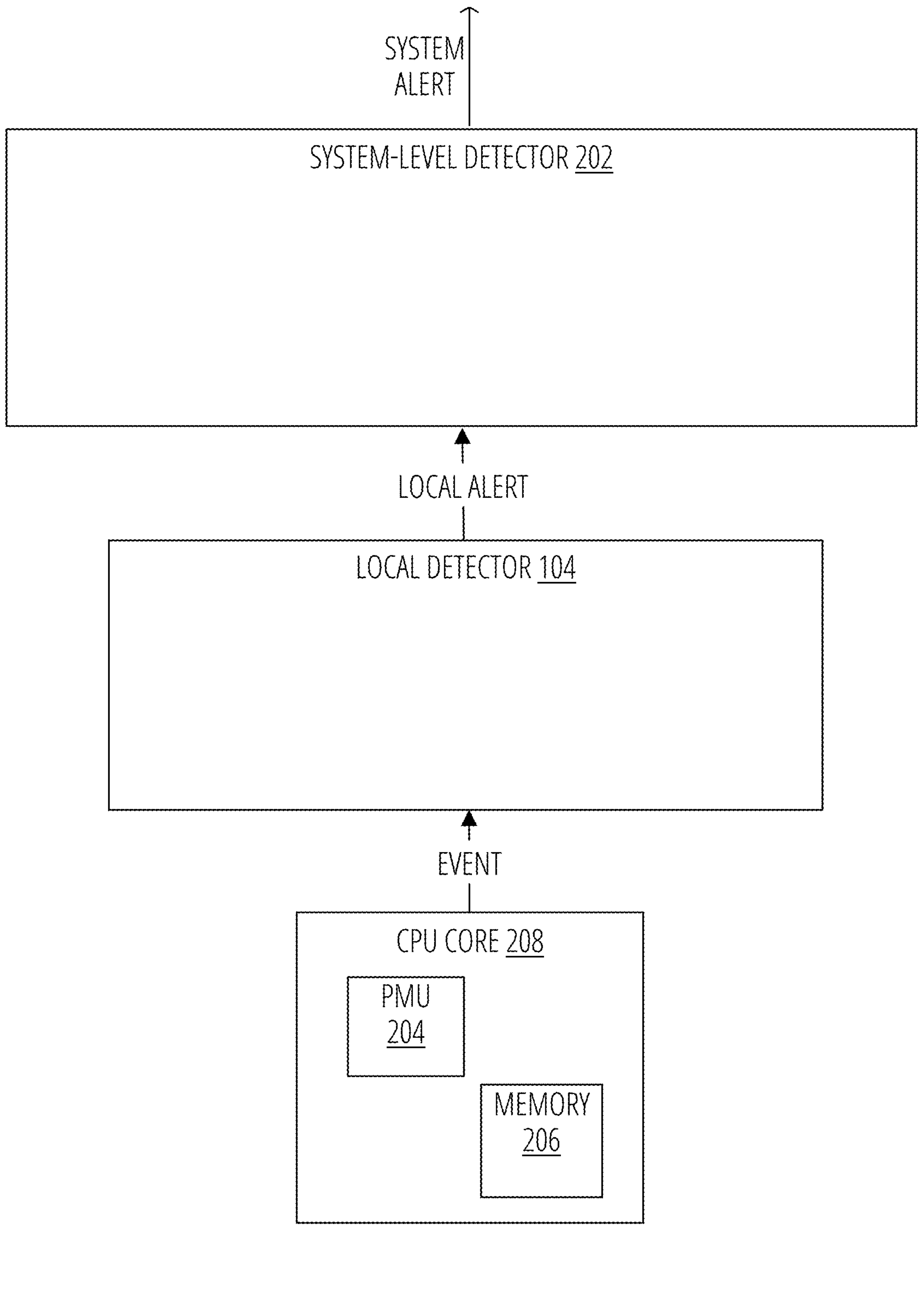
FIG. 2 illustrates a schematic diagram of a response pipeline for events and alerts.

FIG. 2 illustrates a schematic diagram of a response pipeline for events and alerts. Referring to FIG. 2, a CPU core 208, e.g., the source of events, includes a PMU 204 and a memory 206. The processor 102 can execute commands/instructions stored in the memory 206. As commands/instructions are performed, certain activities, operations, and behaviors at the CPU core 208 and its interfaces may be considered events. CPU core 208 can function similarly to processor 102 shown in FIG. 1 and produce PMU events. The local detector 104, as described above with reference to FIG. 1, produces local alerts which can then be sent to system-level detector 202 for further refinement, e.g., to produce a system alert with a higher confidence level than the local alert and thus less likely to be a false positive. These system alerts can then be used by further applications to take a responsive action, for example.

Figure 3:
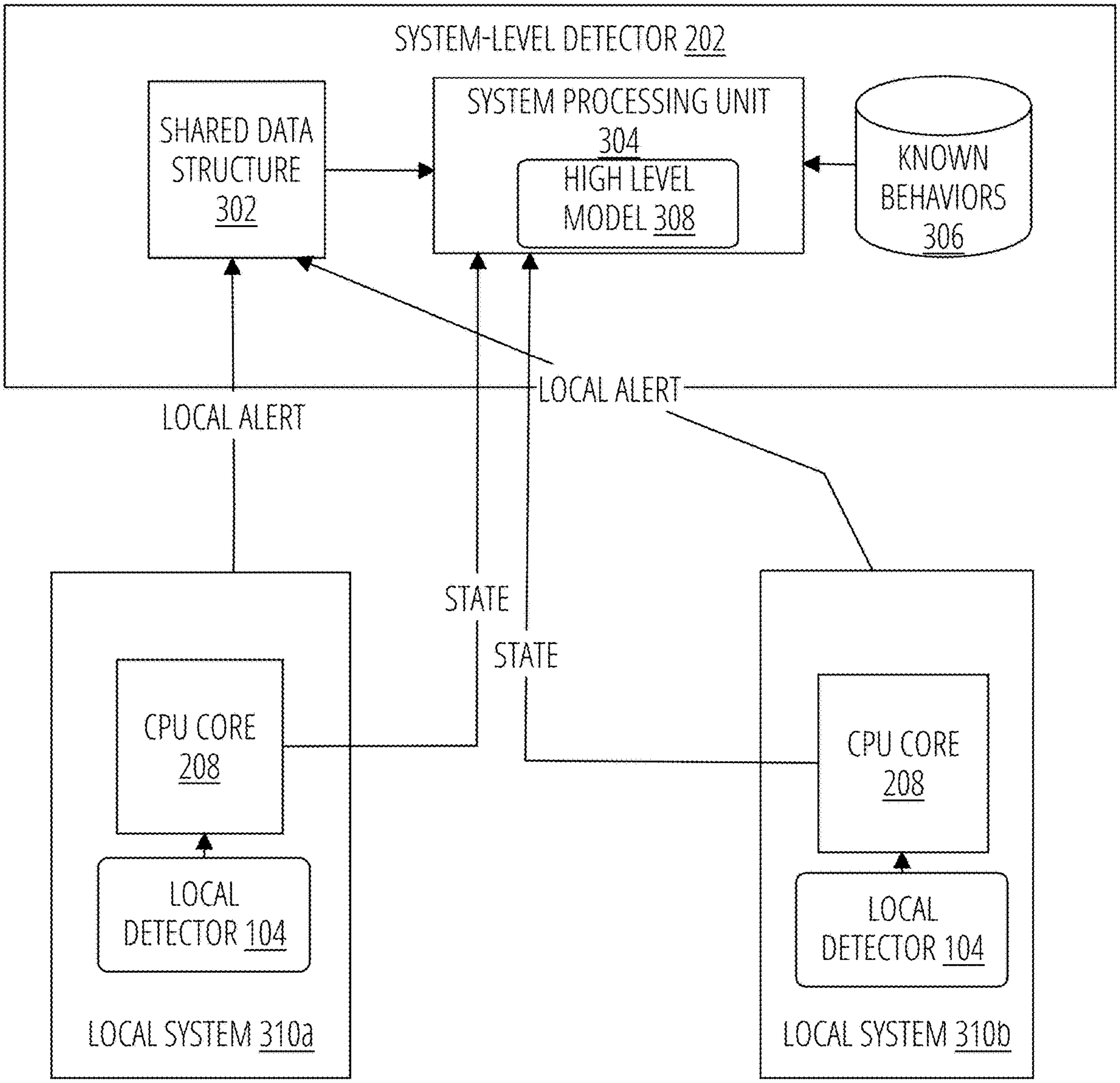
FIG. 3 illustrates a schematic diagram of an operating environment of a behavioral system-level detector.

FIG. 3 illustrates a schematic diagram of an operating environment of a behavioral system-level detector 202. Referring to FIG. 3, an operating environment of a system-level detector 202 can include one or more local detectors 104, creating consumable events and sending out local alerts when these consumable events include undesirable behaviors. Each local detector 104 can be as described with reference to FIG. 1. For example, each local detector 104 detects events from a processing unit. The processing unit can be, for example, a corresponding CPU core 208. The local alerts are sent by each local detector 104 to system-level detector 202, which is arranged to receive the local alerts from the one or more local detectors 104, which may be on a same or different local system (e.g., local system 310*a,* local system 310*b*).

The system-level detector 202 can include a shared data structure 302, a system processing unit 304, and training data set of known behaviors 306. Shared data structure 302 can include registers and/or other storage devices. Shared data structure 302 receives and stores the local alerts from the one or more local detectors 104.

System processing unit 304 is coupled to the shared data structure 302 to receive the local alert. In some cases, the system processing unit 304 is coupled to and communicates with each processing unit, (e.g., CPU core 208 of local system 310*a* and CPU core 208 of local system 310*b*), within the operating environment. Thus, one or more local alerts from one or more local detectors 104 can be received into the shared data structure 302 over a period of time.

Figure 4:
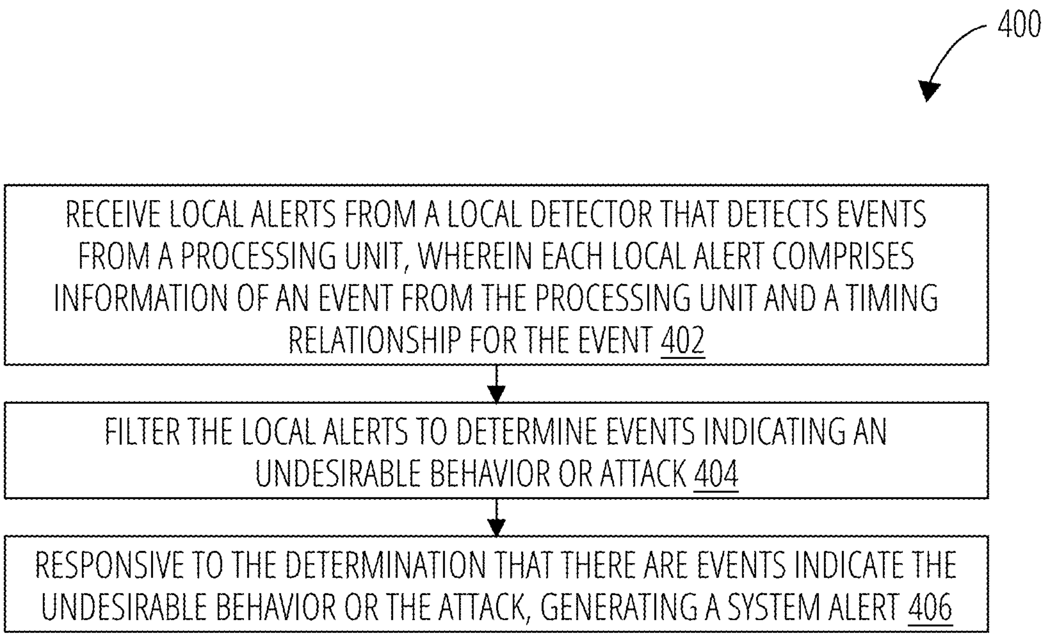
FIG. 4 illustrates a method in accordance with one embodiment.

FIG. 4 illustrates a method in accordance with one embodiment. Method 400 can be performed by a computing system supporting a system-level detector as described with respect to FIG. 3. Referring to FIG. 4, the method 400 includes, at block 402, receiving local alerts from a local detector that detects events from a processing unit, wherein each local alert comprises information of an event from the processing unit and a timing relationship for the event. The method further includes, at block 404, filtering the local alerts to determine events indicating an undesirable behavior or attack. At block 408, responsive to the determination that there are events indicates the undesirable behavior or the attack, generating a system alert.

In some cases, after receiving the local alerts into the shared data structure 302, the system processing unit 304 can order the local alerts according to the timing relationship of the event. The system processing unit 304 orders, or reorders, the local alerts in the shared data structure 302 to maintain temporal coherency so that the state of the overall system, e.g., local system 310*a* and local system 310*b*, can logically make sense when evaluating the local alerts.

System processing unit 304 filters the local alerts to determine events indicating an undesirable behavior or an attack. The system-level detector 202 can filter the local alerts based on different criteria. In a first embodiment, the system-level detector 202 can filter the local alerts based on the timing information. For example, in some cases, a number of local alerts are counted in the shared data structure during a period of time. The system-level detector 202 can then determine that the number of local alerts in the shared data structure 302 is above a threshold for the period of time. When the number of local alerts is above the threshold in the period of time, the system-level detector generates a system alert to indicate the undesirable behavior or an attack. On the other hand, if the system-level detector 202 determines that the number of local alerts in the shared data structure 302 is below the threshold in the time period, the shared data structure 302 can be emptied so that the local alerts received during the time period are ignored. Additionally, the system-level detector 202 can determine that one or more of the local alerts may be important for further analysis and keeps these local alerts and deletes other local alerts that are deemed to be unimportant.

The system alert signifies an undesirable behavior or an attack with a higher confidence level than that determined by the local detector 104 corresponding to the local alert. In this way, the system-level detector 202 can refine the results from the local detector 104 removing false positives. The system alert can be used in further applications for tuning and other improvements. The issued system alert can include the consumable event(s), e.g., information of the event and the timing information of the event.

In some cases, the system-level detector 202 can filter the local alerts based on the information of the event in the shared data structure 302. The system-level detector 202 can check for a confidence score in the information of the event for each local alert during the period of time. Then, the system-level detector 202 can count the number of local alerts in the shared data structure 302 having a confidence score above a threshold. When the number of local alerts is above the threshold in the period of time, the system-level detector 202 generates a system alert to indicate the undesirable behavior or an attack. For example, if a first event is received into the shared data structure 302 at a first time within the period of time and includes a confidence score that indicates an above average confidence score and a second event is received in the shared data structure 302 at a second time within the period of time that also indicates an above average confidence score, the 'confidence' that an attack or undesirable behavior is occurring is higher than if only the first event or the second event was received in the period of time. Similarly, the system level detector can integrate the confidence density. In this scenario, the system-level detector 202 adds the confidence scores from the local alerts in the shared data structure 302 to obtain a total value of the confidence scores. The total value of the confidence scores can be compared to a threshold. When the total value of the confidence scores is above the threshold in the period of time, the system-level detector 202 generates a system alert to indicate the undesirable behavior or an attack. The filtering can also be accomplished by taking a linear combination of the confidence scores, with weights determined by the classification.

In some cases, the system-level detector 202 can filter the ordered local alerts based on a sequence of events occurring. The system-level detector 202 can check a category of the event in the information of the event for each local alert in the shared data structure 302 during the period of time. When a sequence of categories of the events occurs in the period of time, the system-level detector 202 generates a system alert to indicate the undesirable behavior or an attack. As described previously, the information of the event can include a classification to a predefined category describing a behavior. If the system-level detector 202 detects a sequence of these categories coming in from the local alerts, for example, that may indicate an attack. Of course, other ways of filtering the ordered local alerts according to the timing relationship and information of the event can be performed.

In some cases, the system processing unit 304 is able to obtain state information of the processing unit corresponding to the time of the event according to the timing relationship for the event. FIG. 3 shows that the state of the CPU core 208 is obtained directly from the CPU core 208, e.g., processing unit, however, the state information of the CPU core 208, can be obtained from the corresponding local detectors 104. Because the consumable event associated with the local alert includes the time the event was created, the time can be utilized by the system processing unit 304 to correlate the local alert to the state of the CPU core 208 at that time. The state of the CPU core 208, e.g., the system context in which the local alert was generated, can include timing information, which process is running at a given time, process identification, summarized data in a cache of the CPU core, DMA (Direct Memory Access) configuration, etc., i.e., anything that can affect the execution of the CPU core 208.

In some cases, the system processing unit 304 can evaluate the state information of the CPU core 208 with respect to the information of the event from the CPU core 208. The evaluation can include the system processing unit 304 comparing the behavior described by the information of the event with a stored training data set of known behaviors 306, in the context of the state of the CPU core 208, at the time corresponding to the event. The system processing unit 304 looks for similar behavior to the event information from the CPU core 208. The system processing unit 304 uses the comparison to determine that the behavior describes an undesirable behavior or an attack.

In some cases, the system processing unit 304 can include one or more processors and storage to support artificial intelligence, machine learning and/or deep learning processes. In some cases, the system processing unit 304 can use a trained high-level model 308 created by a higher-order machine such as modeling engine 502. Modeling engine 502 can be implemented, for example, by a neural network or using deep learning technique that uses a training data set of known behaviors 306 to perform analysis on the received local alert in order to generate the confidence level of the local alert. In an embodiment, system-level detector 202 can for example, be configured to detect patterns of events, from one or more sources, known to exhibit attack characteristics, potentially in real time.

Figure 5:
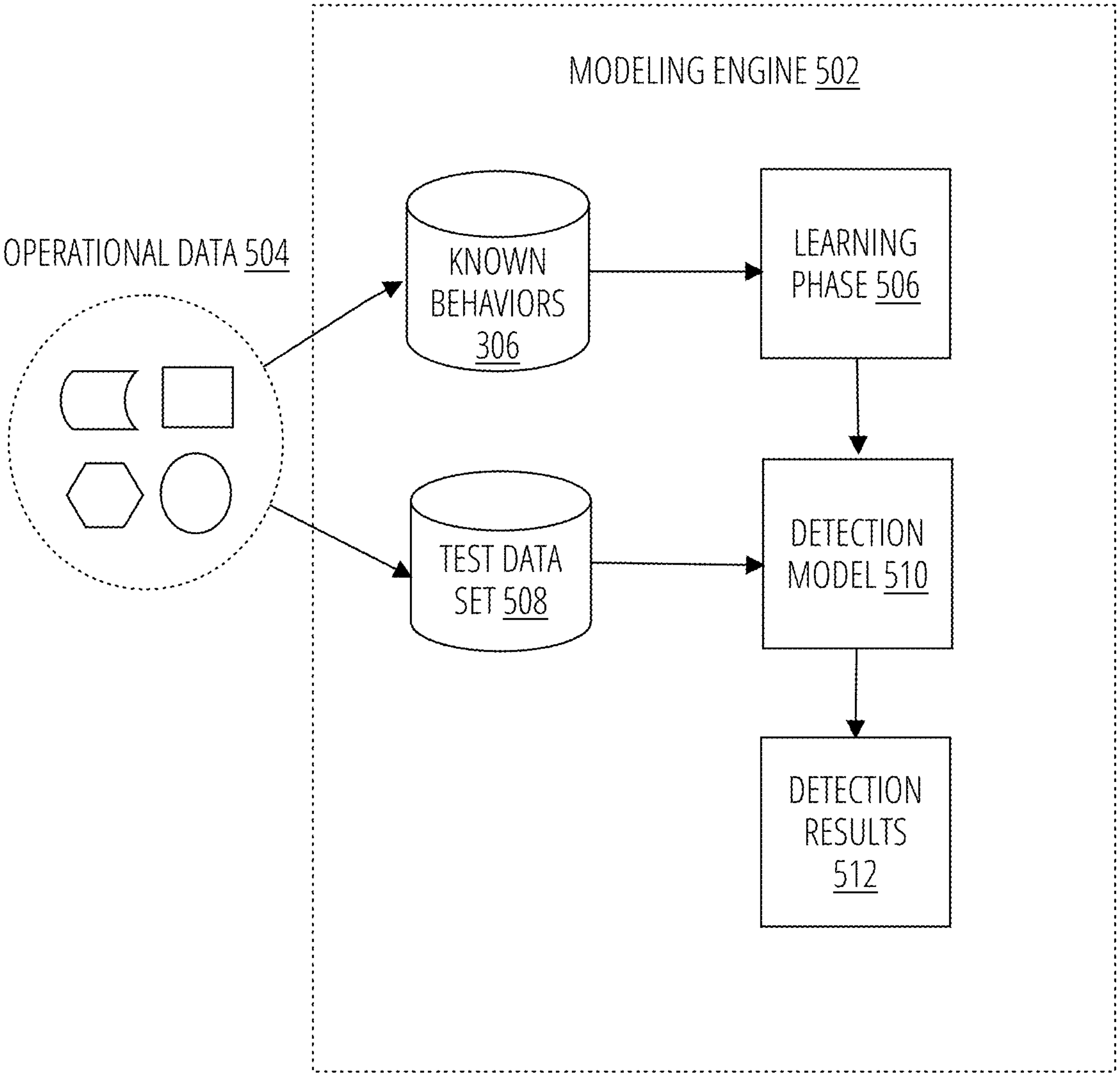
FIG. 5 illustrates an example of a modeling engine.

FIG. 5 illustrates an example of a modeling engine 502 that could be used to create the trained high-level model 308. Modeling engine 502 can receive operational data 504, such as known behaviors from one or more sources, to be used as a training data set in a learning phase 506 to generate an initial model. The learning phase 506 can feed the initial model to the detection model 510, which takes in a test data set 508 to generate detection results. The learning phase 506 can include one or more methodologies of machine learning, including deep learning or use of various neural networks. Using the detection model 510, the outputs of the learning phase 506 can be compared against the test data set 508 to determine the accuracy of the model trained in the learning phase 506. The process can continue until a high-level model 308 with a desired accuracy is attained.

In operation, the proposed method filters local alerts by correlating the received information of an event with a state of the processing unit to determine events indicating an undesirable behavior or attack. The local alerts can be received by a system-level detector from one or more noisy local detectors. Correlating the state of the processing unit with the information of the event improves prediction confidence of known behaviors associated with the events. With the improved prediction confidence, one gains the ability to filter out the local alerts that describe acceptable behaviors, e.g., false positives, while also being able to detect an attack with greater confidence and possibly in real time.

In some cases, the state of the processing unit is based on the timing information. In other cases, the state of the processing unit is based on the information of the event. For example, in cases where a confidence score is part of the information of the event from the local detector, the confidence level generated by the system-level detector that the event or events belong to a category of behavior is likely to be a higher value such that the determination of such categorization is more likely to be accurate. In addition, the system-level detector has much more computing power than the local detectors and can run at a lower speed, e.g., on the order of milliseconds, such that the system-level detector has more time to do its computing and thus produces better results, e.g., a decision with a higher level of confidence.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method, comprising:

receiving local alerts from a local detector that detects events resulting from execution of a processing unit, wherein each local alert comprises information of a respective event of the events and a timing relationship for the respective event;

receiving the local alerts into a shared data structure over a period of time;

filtering the local alerts to determine events indicating an undesirable behavior or attack; and responsive to the determination that there are events indicating the undesirable behavior or the attack, generating a system alert, wherein the filtering of the local alerts comprises:

checking a confidence score in the information of the respective event during the period of time for each local alert in the shared data structure;

counting a number of local alerts that have a confidence score above a threshold during the period of time;

determining that the number of local alerts is above the threshold in the period of time; and responsive to the number of local alerts being above the threshold in the period of time, determining that corresponding events indicate the undesirable behavior or the attack.

2. The method of claim 1, further comprising ordering the local alerts according to the timing relationship for the respective ones of the events.

3. The method of claim 1, wherein the method receives local alerts from multiple local detectors into the shared data structure, each local detector detecting events from a corresponding processing unit.

4. The method of claim 2, wherein filtering the ordered local alerts to determine events indicating the undesirable behavior or the attack comprises:

checking a category of the respective event in the information during the period of time for each local alert in the shared data structure; and determining a sequence of categories from the ordered local alerts in the shared data structure.

5. The method of claim 1, wherein the processing unit is a central processing unit (CPU) core.

6. The method of claim 1, wherein the respective event is a performance monitoring unit (PMU) event.

7. The method of claim 1, further comprising obtaining state information of the processing unit corresponding to a time of the respective event according to the timing relationship.

8. The method of claim 7, further comprising evaluating the state information of the processing unit with respect to the information of the respective event from the over the period of time to determine events indicating the undesirable behavior or the attack, the evaluating includes:

comparing a behavior described by the information of the respective event from the processing unit with a stored training data set of known behaviors.

9. The method of claim 8, wherein evaluating the state information of the processing unit with respect to the information of each respective event from the processing unit over the period of time to determine events indicating the undesirable behavior or the attack, utilizes a high-level model implemented with a neural network or deep learning technique.

10. A system-level detector, comprising:

a shared data structure for storing local alerts received over a period of time from at least one local detector that detects events resulting from execution of a corresponding processing unit, wherein each local alert comprises information of a respective event from the processing unit and a timing relationship for the respective event; and a system processing unit coupled to the shared data structure to receive the local alerts from the shared data structure and coupled to receive state information of each corresponding processing unit, the system processing unit having instructions to:

receive local alerts from the shared data structure, order the local alerts according to the timing relationship for each respective event, filter the ordered local alerts to determine events indicating an undesirable behavior or attack, check a confidence score in the information of the respective event during the period of time for each local alert in the shared data structure, count a number of local alerts that have a confidence score above a threshold during the period of time, and determine that the number of local alerts are above the threshold in the period of time, responsive to the number of local alerts being above the threshold in the period of time, determine that the events indicate the undesirable behavior or the attack, and responsive to the determination that there are events indicating the undesirable behavior or the attack, generate a system alert.

11. The system-level detector of claim 10, wherein the system processing unit further has instructions to:

check a category of each respective event in the information during the period of time for each local alert in the shared data structure, and determine a sequence of categories from the ordered local alerts in the shared data structure.

12. The system-level detector of claim 10, wherein the state processing unit further has instructions to obtain, for a particular processing unit, state information corresponding to a time of the respective event according to the timing relationship.

13. The system-level detector of claim 12, wherein the system-level detector utilizes a high-level model implemented with a neural network or deep learning technique to evaluate the state information of the processing unit with respect to the information of the respective event from the processing unit over the period of time to determine events indicating the undesirable behavior or the attack.

14. The system-level detector of claim 10, wherein the system-level detector is communicatively coupled to a plurality of local detectors and corresponding processing units.

15. A method, comprising:

receiving local alerts from a local detector that detects processor-level events resulting from execution of a processing unit, wherein each local alert comprises information of a respective event of the events and a timing relationship for the respective event;

receiving the local alerts into a shared data structure over a period of time;

filtering the local alerts to determine events indicating an undesirable behavior or attack; and responsive to the determination that there are events indicating the undesirable behavior or the attack, generating a system alert, wherein the filtering of the local alerts comprises:

checking a confidence score in the information of the respective event during the period of time for each local alert in the shared data structure;

adding the confidence scores from each local alert in the shared data structure to obtain a total value of confidence scores;

determining that the total value of confidence scores is above a threshold in the period of time; and responsive to the total value of confidence scores being above the threshold in the period of time, determining that the corresponding events indicate the undesirable behavior or the attack.

16. The method of claim 15, further comprising ordering the local alerts according to the timing relationship for the respective ones of the events.

17. The method of claim 15, wherein the method receives local alerts from multiple local detectors into the shared data structure, each local detector detecting events from a corresponding processing unit.

18. The method of claim 15, wherein the respective event is a performance monitoring unit (PMU) event.

* * * * *